Nov. 5, 1963 H. HOWE Re. 25,472

SNOWSHOE HARNESS

Original Filed May 12, 1961 4 Sheets-Sheet 1

INVENTOR
HAROLD HOWE

BY John N. Hoag
ATTORNEY

SNOWSHOE HARNESS
Original Filed May 12, 1961 4 Sheets-Sheet 2
FIG.5
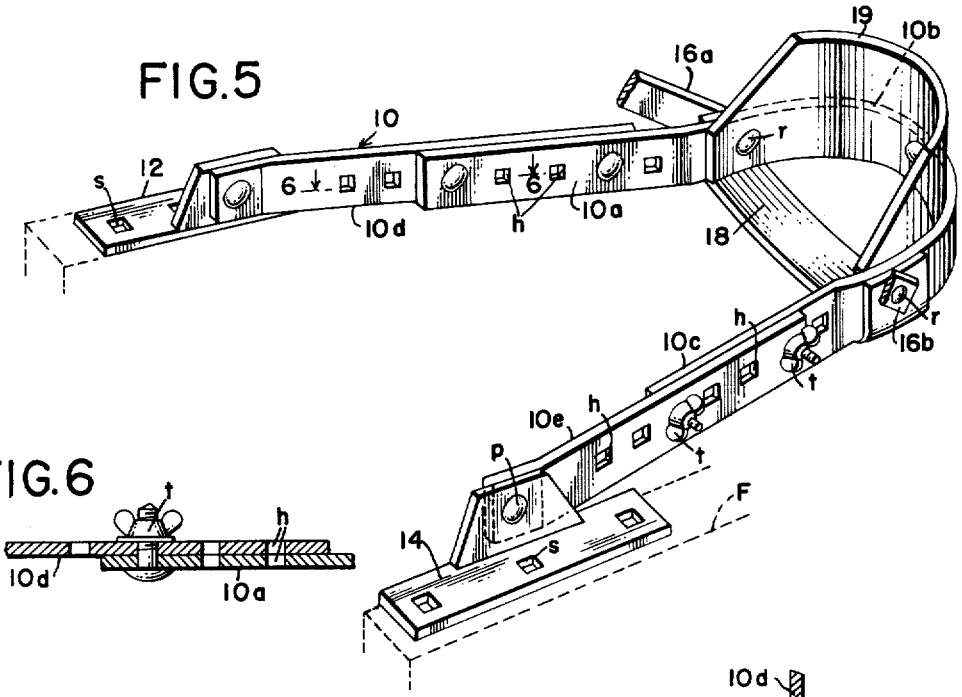
FIG.6
FIG.7
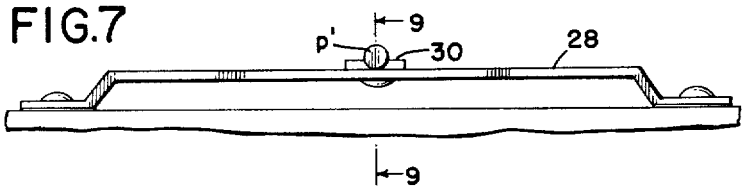
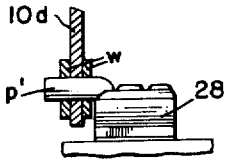
FIG.9
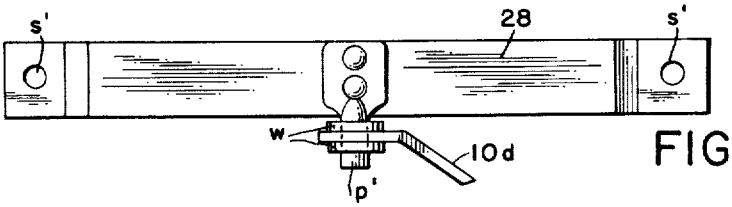
FIG.8
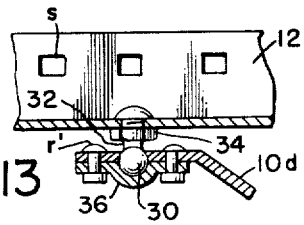
FIG.13
INVENTOR
HAROLD HOWE
BY John A. Haag
ATTORNEY

SNOWSHOE HARNESS

Original Filed May 12, 1961 4 Sheets-Sheet 3

INVENTOR
HAROLD HOWE

BY John N. Lucas
ATTORNEY

SNOWSHOE HARNESS

Original Filed May 12, 1961 4 Sheets-Sheet 4

INVENTOR.
HAROLD HOWE

BY

John N. Hoag

ATTORNEY

United States Patent Office

Re. 25,472
Reissued Nov. 5, 1963

25,472
SNOWSHOE HARNESS

Harold Howe, Rowayton, Conn., assignor to Howe Folding Furniture, Inc., New York, N.Y., a corporation of New York Original No. 3,060,600, dated Oct. 30, 1962, Ser. No. 126,742, May 12, 1961. Application for reissue Feb. 26, 1963, Ser. No. 261,945
7 Claims. (Cl. 36—4.5)

Matter enclosed in heavy brackets [ ] appears in the original patent but forms no part of this reissue specification; matter printed in italics indicates the additions made by reissue.

This invention relates to a snow shoe harness. This application is a continuation-in-part of co-pending application of Serial No. 18,558, filed March 30, 1960, now Patent 3,000,117, granted September 19, 1961.

Snow shoes comprise a frame enclosing an area which is criss-crossed with a lacing of rawhide. Harnesses are required to secure the user's boots to the snow shoes so that he will have control of them at all times both on a level surface and while travelling over sloping terrain.

In walking on snow shoes the user needs to lift the front end of a snow shoe at the start of a step and move the snow shoe forward. At the end of a step the front end of the snow shoe is lowered again and the user's foot rotates forwardly on the ball of the foot causing the heel of the user's boot to be lifted from the snow shoe surface, i.e., upwardly from the lacing, as the user advances the other snow shoe. As the user's boot is rotated forwardly the toe of the boot is somewhat tilted forwardly into an opening provided in the lacing.

Since snow shoes are used on sloping terrain as well as on the level a satisfactory harness must provide complete and continuous control of a snow shoe at all times, both for travel on the level and on inclines including side slopes. When used on an incline sloping laterally of a snow shoe the strain on a harness is severe. The heel of the user's boot tends to swing in the direction of the slope and if this occurs the control of the snow shoe decreases.

Snow shoe harnesses of the prior art have been unsatisfactory in failing to provide rigid and continuous control. The prior art includes harnesses comprising only flexible straps, which are unsatisfactory for the reasons given above, and harnesses which employ a rigid U-strap intended to fit snugly along the sides of the user's boot in addition to extending around the heel. Such U-members are very inadequate for the torsional strain to which they are subjected when the user is crossing an incline sloping transversely of the direction of travel, and the pressure of the boot against one side of the U-member is very tiring as well as causing wear on the side of the boot.

In applicant's Patent No. 2,821,031, means were provided for controlling a snow shoe primarily from the heel of the user's boot. This was accomplished by flexible strap means which transmitted pressure against the heel of a boot from points on a snow shoe well in advance of the heel of the boot and spaced laterally from the sides of the boot, the pressure thus applied on the heel serving to hold the boot against toe abutment means which determined the position of the boot longitudinally on the snow shoe. This structure gave improved control against forces tending to swing the user's heel laterally with respect to the longitudinal mid-line of the snow shoe, and it met with commercial success.

The harness which is the subject of this application is an improvement upon the harness disclosed in applicant's Patent No. 2,821,031. Ths harness disclosed in that patent is not altogether satisfactory since the flexible strap means stretches, or shrinks when wet, to a degree which still permits an undesirable amount of movement of the heel of the user's boot transversely of a snow shoe, and when such movement occurs the flexible strap on the side of the boot which is in the direction of the swinging movement of the boot becomes slack and ceases to support the boot in a position to satisfactorily control the snow shoe.

An object of this invention is to provide an improved snow shoe harness such that the snow shoe will be continuously under control at all times including forward, lateral, tilting and swinging movements of the snow shoe.

Another object of the invention is to provide control of a snow shoe from the heel of a user's boot by holding the boot back against means providing an abutment for the heel of a boot.

The invention will best be understood if the following description is read in connection with the accompanying drawings in which:

FIG. 5 is a perspective view of one embodiment of the invention, partly broken away;

FIG. 6 is a detail view partly in section taken on the line 6—6 of FIG. 5;

FIG. 7 is a side elevation of a modified pivot bracket;

FIG. 8 is a top plan view of the bracket shown in FIG. 7;

FIG. 9 is a vertical cross-section taken on the line 9—9 of FIG. 7;

FIG. 13 is a plan view of a preferred interconnection between one end of a control member and a bracket adapted to be mounted on a snow shoe frame;

Figure 15:
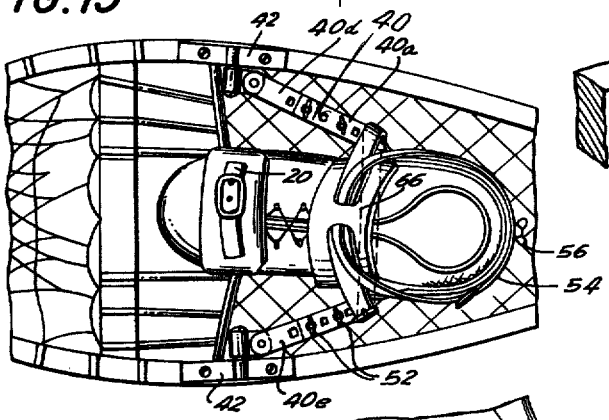
FIG. 15 is a top plan view of the structure shown in FIG. 14.

FIG. 15–A is a detailed perspective view, and

Figure 3:
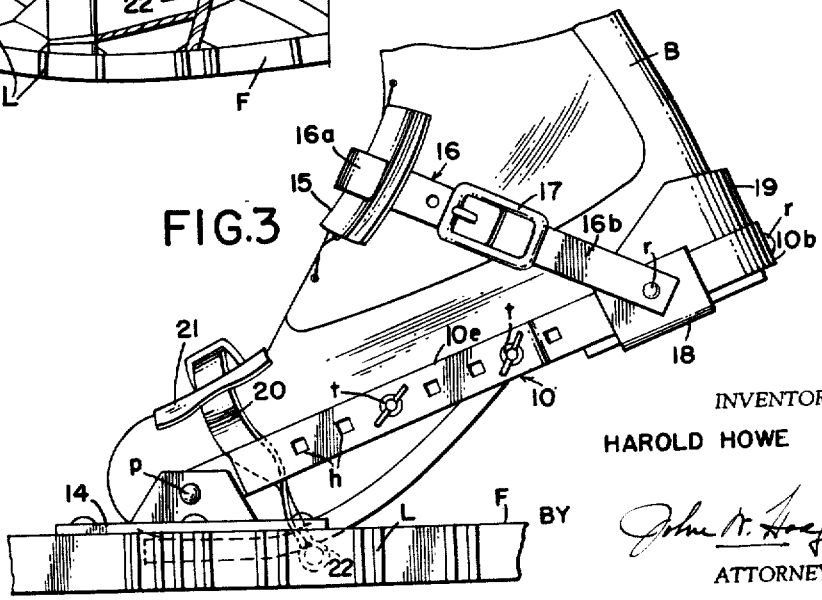
FIG. 3 is a side elevation.
Figure 10:
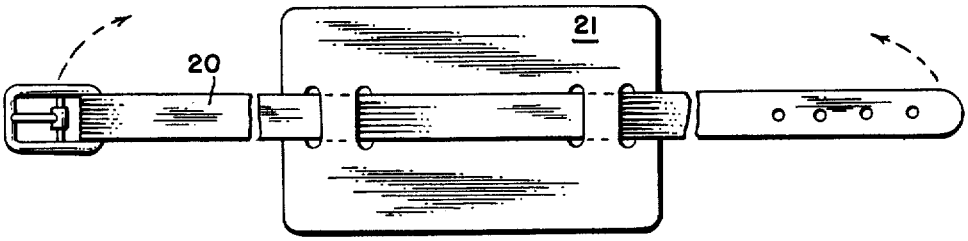
FIG. 10 is a plan view partly broken away of a strap and keeper for holding the toe of a boot down on a snow shoe.
Figure 11:
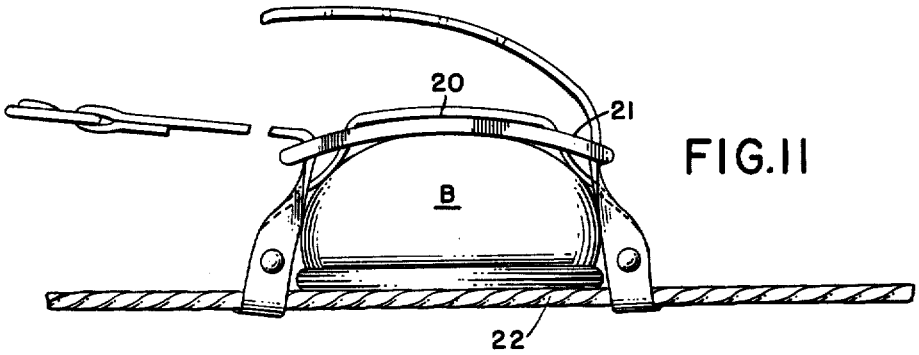
FIG. 11 is a transverse sectional view looking toward the toe of a user's boot which is held down on the snow shoe by the means illustrated in FIG. 10, and showing a preferred way of attaching the said means to a snow shoe.
Figure 12:
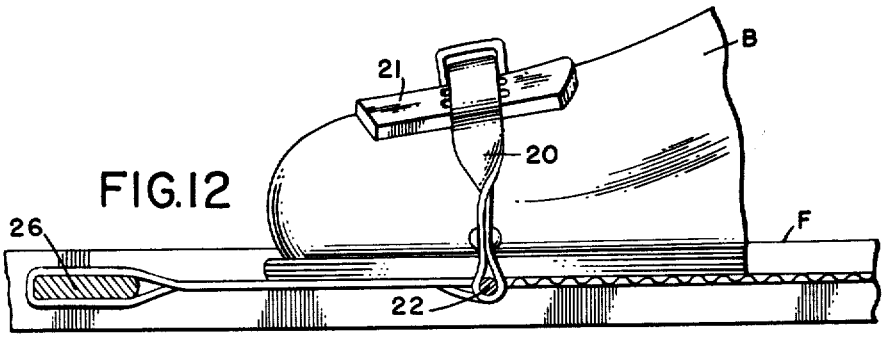
FIG. 12 is a side view of the structure shown in FIG. 11.
Figure 14:
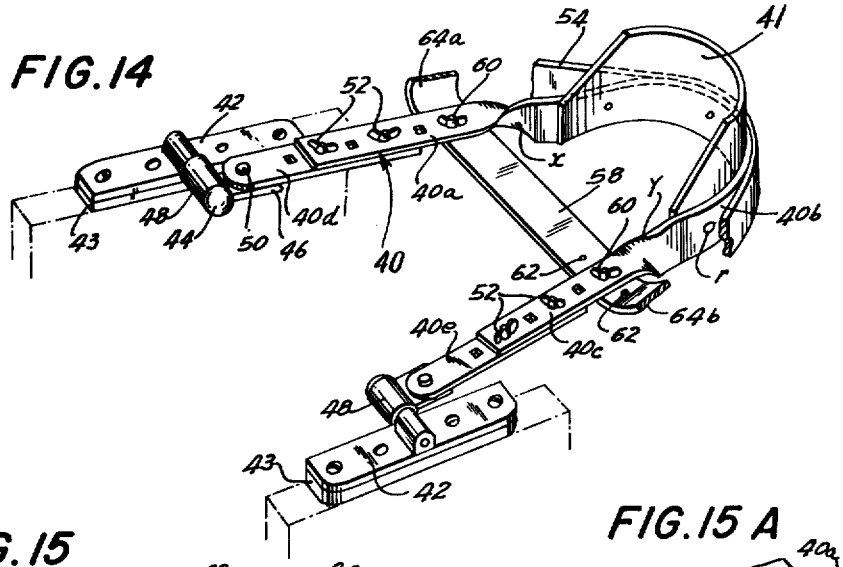
FIG. 14 is a perspective view similar to FIG. 5 showing a modified embodiment of the invention.
Figure 15A:
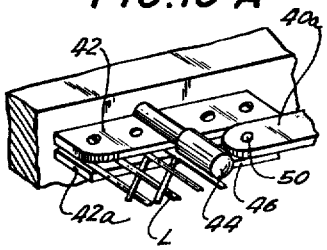
Figure 16:
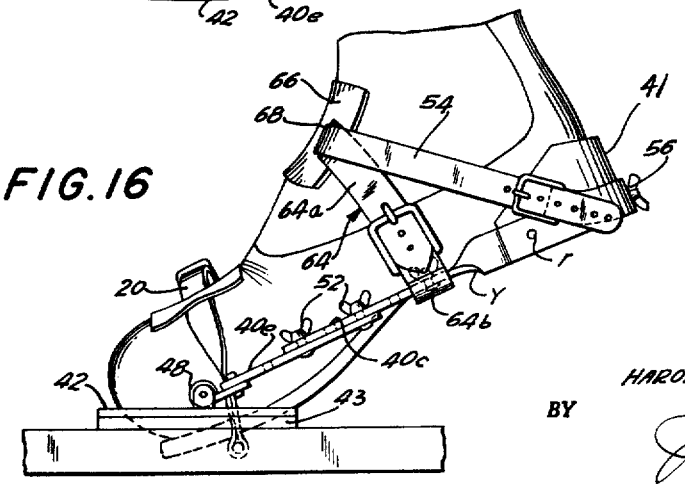

FIG. 16 is a side elevation, similar to FIG. 3 of the modified structure shown in FIGS. 14–15A.

Figure 1:
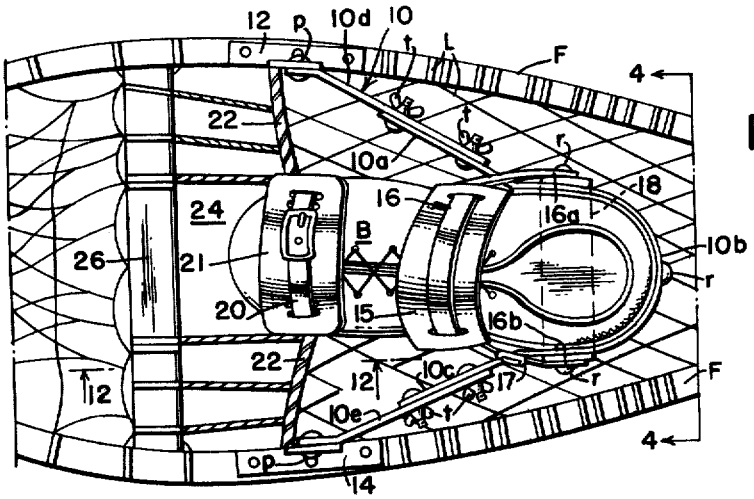
FIG. 1 is a top plan view.
Figure 2:
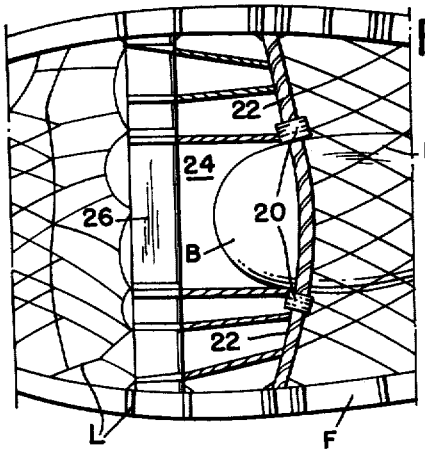
FIG. 2 is a bottom plan view.

In the embodiment of the invention shown in FIG. 1 of the drawings the harness comprises the combination of, a rigid heel control member 10, the brackets 12 and 14 *which are mounted on the frame F* to which the forward end of the control member 10 are respectively pivotally mounted, a means 16 anchored to the control member 10 for extending around the front of a user's boot *B* in the region of the instep and holding the boot in home position against the control member 10, a means 18 for limiting downward movement of the heel of the boot relative to the control member 10, and a means 20 for holding the toe of a boot down on the snow shoe irrespective of the lifting and lowering of the heel of the boot together with the said member 10, which occurs each time a step is taken.

This combination has the advantage of providing more complete control of a snow shoe than has previously been obtained. This control is the result of pressure exerted against the heel of the user's boot and maintained at all times while the snow shoe is in use, both while stepping forwardly, backwardly or sideways, and while swinging the snow shoe to change the direction in which they are pointing. This combination also has the advantage that the whole harness may be mounted on a snow shoe at an angle to the longitudinal center line of the snow shoe. Some snow shoers prefer to have their boots angled slightly so that the toe of the snow shoe is on the opposite side of the longitudinal center line of the snow shoe from the heel. This can be accomplished by positioning brackets 12 and 14 on the snow shoe at an angle to the center line of the snow shoe and with one bracket slightly in advance of the other, or by adjusting the arms of the control member to make the arm on one side longer than the arm on the other side.

Preferably the control member 10 comprises an intermediate portion 10b, which is substantially U-shaped and adapted to serve as an abutment for the heel of a boot and desirably providing contact not only on the extreme rear end of the heel but also to some extent along the sides of the heel, and the portions or arms 10a and 10c which are angled outwardly and extend from the portion 10b to the pivot mountings provided on the brackets 12 and 14, or, as illustrated herein arms 10a and 10c are extended by members 10d and 10e which extend to the pivot mountings p on the brackets.

The member 16 is desirably a flexible two-part strap comprising the parts 16a and 16b, respectively, one end of each of said parts being secured as by rivets r to the control member 10, and preferably to opposed portions of the intermediate portion 10b, and buckle means 17 carried by one of said parts 16a or 16b and adapted to engage the corresponding end of the other of said parts 16b or 16a. The intermediate portion 10b of rigid member 10 provides an abutment against which the heel of the boot is positioned and the parts 16a and 16b serve to hold the user's boot in home position against the intermediate portion 10b, thus maintaining pressure against the heel of a user's boot at all times. *Strap part 16a is shown threaded through a keeper 15 which spreads the pressure applied by the strap parts 16a and 16b and increases frictional engagement with the boot.*

Desirably the end portions or arms of member 10 are each adjustable in length. As shown in FIGS. 1, 3 and 5, the arms of member 10 are each adjustable in length and comprise portions 10a and 10c respectively which are integral with portion 10b and portions 10d and 10e which overlap and extend beyond portions 10a and 10c respectively and are pivotally connected adjacent their outer ends to the brackets 12 and 14 respectively. In the embodiment shown in FIG. 5 the portions 10d and 10e may be secured to portions 10a and 10c respectively in various positions of overlap by the thumb screws t.

Figure 4:
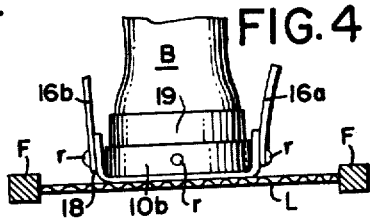
FIG. 4 is an end view taken on the lines 4—4 of FIG. 1.

The member 18 may desirably be a cross member or web of any suitable material extending across the generally triangular space defined by the control member. As shown in FIGS. 1, 3 and 4, member 18 is in the form of a strap the ends of which are brought up on the outside of opposed portions of the intermediate portion 10b of member 10 and anchored to member 10 by rivets r, which may be the same rivets which secure the strap parts 16a and 16b respectively. The web or cross strap 18 provides a floor on which the heel of a boot rests and it serves to prevent the heel moving downwardly with respect to control member 10. The inner surface of portion 10b of member 10 preferably has a liner 19, secured to 10b in any suitable way as by rivets and extending upwardly from 10b to provide an extended area of contact with the heel of the boot.

It will be understood that control member 10 swings up and down around the pivots p together with the heel of the user's boot which moves up and down in taking each step. The members 16 and 18 coact in positioning a user's boot relative to control member 10 so that the boot cannot move forwardly away from abutment with portion 10b of the control member 10 or downwardly relative to the control member 10. The members 16 and 18 coact with member 10 in causing member 10 to swing up and down as the heel of the user's boot is raised and lowered, thus maintaining positive control of the snow shoe by means of pressure communicated from the snow shoe to the heel of the user's boot at all times.

The means for holding the toe of the boot down on the snow shoe is preferably a strap *20* which is threaded through the lacing *L* of the snow shoe and twisted around the toe cord 22 so that an intermediate portion of strap 20 extends on the under side of the lacing and the free ends are brought up on opposite sides of the toe portion of the boot and buckled together tightly enough to hold the toe portion of the boot down on the snow shoe lacing. *Strap 20 is shown threaded through the keeper 21.* Desirably member 20 is twisted around the toe cord on opposite sides of the toe of the boot and adjusted to permit the front end of the toe of the boot to extend through it and over the space 24 between the toe cord 22 and toe cross-bar 26.

Desirably the brackets 12 and 14 are mounted on opposed portions of the snow shoe frame *F* to give a firm control base for attaching the control member 10 and at the same time causing the forward ends of the diverging arms 10a and 10c to be spaced well apart laterally of the snow shoe, which reduces strain on a control member and also increases the control of the boot heel by increasing the pressure which is exerted on the extreme rear of the heel.

In FIGURES 7, 8 and 9 a modified form of bracket 28 is shown, the ends of each of which rest on the snow shoe frame *F* and the intermediate portion of which is raised from the frame, and which has the pivot pins p′ on which the arms of the strap 10 are pivoted. An arm portion 10d is shown in FIGS. 8 and 9 on a pivot pin p′ and held in position by lock washers w, w.

In FIG. 13, one end of a control member 10 is shown connected to a bracket 12 by a ball and socket connection. As illustrated herein, this comprises a ball portion 30 at one end of a stem 32 which is fastened to the flange of a bracket 12 in any suitable way. Portion 32 may comprise a clamp for engaging the flange of bracket 12, or a bolt threaded to receive the nut 34 for clamping against the outer face of the flange after the inner end of the bolt is peened over. The stem 32 extends through the extremity of the arm of member 10 and the ball portion 30 extends partly into the aperture thus provided. A cover member 36 which provides a concavity between two flat ends is secured over the ball portion, as by the rivets $r^1$.

Such a connection is preferred because it permits a control member to be mounted on snow shoes of different width without affecting the freedom of the control member to pivot around its forward ends. It will be appreciated that when the forward ends of the control member 10 are spread apart different distances to engage brackets mounted on opposed portions of snow shoes of different widths the angles of the forward extremities of the control member arms will vary somewhat relative to pivot pins provided on the brackets. The ball and socket connection is not affected by changes in the angular position of the arms of the control member. This is of practical importance since snow shoes are made in different sizes, usually sizes 8″ to 14″ wide, having different widths between opposed portions of the frame in the region of the toe cord.

*FIGS. 14, 15, 15a and 16 illustrate a preferred modification of the structure shown in FIGS. 1–13 inclusive. In this embodiment the rigid control member 40 is twisted through 90° at x and y, where the arms 40a and 40c meet the curved intermediate portion 40b of the control means. This has the advantage of lowering the arms close to the surface of the snowshoe and strengthening them against the strain to which they are subject, especially when the user is traversing a slope, and at the same time minimizing the surface area of the harness which is*

*opposed to the snow. When a snowshoe equipped with this harness is resting on a level surface and the control member 40 is down on the surface of the snowshoe its intermediate curved portion 40b is disposed vertically and the arms 40a and 40c are low and extend horizontally in a plane close to the surface of the snowshoe.*

*The brackets shown in FIGS. 14–16 are also low and cause a minimum of interference in use. Each comprises a member 42 and a short rigid strap 46 which is rotatable in a plane substantially normal to the surface of the snowshoe around a pivot pin 44 projecting laterally from member 42 inwardly over, and substantially parallel to the snowshoe surface. The member 42, as shown in FIG. 14, is screwed on the snowshoe frame approximately in line with the toe strap 20, and, as shown in FIG. 15a, is disposed on the lacing L and secured to a back plate 42a disposed beneath the lacing adjacent the frame. Between the member 42 and the frame or the lacing an intermediate lining and spacing member 43 may be employed. It may be a strip of leather for example. And the intermediate portion 40b of the central member is shown with a liner member 41 of leather or other material suitable for frictionally contacting the mid-point of the heel of the user's boot.*

*Each short strap member 46 has at one end the bearing sleeve 48 extending transversely of the strap and adapted to receive, and to rotate around, the pivot pin 44 of the bracket assembly of which it is a part. The inner ends of the pivot pins 44 are enlarged, or peened over after the bearing sleeves 48 are positioned on the pins respectively. Projecting upwardly from and normal to, the short straps 46 respectively are the pivot pins 50 on which the forward ends of the arms of the rigid control member 40 are pivoted, for movement in a plane substantially parallel to the snowshoe surface.*

*The control members 40 and particularly their intermediate portions 40b are somewhat resilient permitting the arms 40a and 40c to be swung toward and away from one another. Although such movement changes the angle of the arms it does not affect the pivoting of the forward ends of the arms on pivots 50 respectively. With the double pivot mountings described above a single control member can be employed on snowshoes of a variety of widths, in conjunction with pairs of brackets spaced apart different distances.*

*As shown herein, the arms 40a and 40c and the arm extension members 40d and 40e respectively are perforated at equal distances and are overlapped and adjustably secured together as by bolts and wing nuts 52.*

*As shown in the FIGS. 14–16, a strap 54 is secured intermediate its ends on the outer surface of the intermediate portion 40b of the control member at its mid-point, as by a screw and wing nut 56. One end of the strap is passed around the boot and over its instep and the ends then adjustably fastened together to hold the heel of the boot in abutting relation to the mid-part of the intermediate portion 40b.*

*A cross member 58 is provided extending between opposed points on the control member to provide a floor for the instep and heel portion of the boot, and means, in addition to means 54, is provided to hold the instep and heel portion of the boot down on the cross member 58. The arms 40a and 40c of the control member are shown perforated adjacent the juncture of the intermediate portion 40b with the arms respectively, and the cross member is detachably secured to the arms, as by threaded bolts, which pass through the cross member and the perforations in the arms respectively, and the wing nuts 60.*

*The cross member 58 is punched with a number of apertures 62 so that it may be attached to said arms at different points to compensate for variations in the distance between the arms, which as stated above may be sprung further apart or brought closer according to the distance between the mounting bracket pivots 50.*

*The means for holding the instep and heel portion of the boot down on the cross member 58 may be a plurality of strap parts secured to the arms 40a and 40c respectively, as by threaded bolt and wing nut means 60, with one strap part passed over the instep portion of the boot and adjustably secured to the other part. As illustrated the cross member 58 is an intermediate portion of the strap 64 the end 64a of which is brought over the instep of the boot and fastened to the other end 64b.*

*A single keeper 66 is employed for keeping both the strap means 54 and the strap means 64a, 64b in place over the instep of the boot and for distributing the pressure of the strap means over the instep portion of the boot. The keeper may be a rectangle of leather wider than the said strap means and having a plurality of slits 68 through which both of said strap means are threaded. The said strap means are thus brought together over the instep but are spaced apart along the control member providing a more or less triangular connection between the control member and the keeper 66 on each side of the boot.*

The structure shown in FIGS. 14–16 has the advantages: that it is very strong where the greatest strength is needed, that is, in resistance to strain on the arms of the control member exerted transversely, as for example, in crossing a slope where the weight of the user is exerted against the down hill arm of the control member; and the control member arms and the supporting bracket means are low and thus eliminate any chance of interference when one shoe is passing the other shoe in travel; the cross straps can be adjusted in position longitudinally of the control arms if desired; the supporting bracket means is characterized by two sets of pivots, one of which extends over the surface of the snow shoe in a plane substantially parallel with the snow shoe surface, and the other of which extends upwardly, normal to the short strap 46, is of very real practical importance since together they provide the advantages of a universal joint and also make it possible for a given control member to be assembled on any of a number of snow shoes of different widths or on which the supporting bracket means are spaced apart different distances. Since the control member 10 is somewhat resilient the angular position of its arms relative to one another can be changed, but any change makes for somewhat imperfect connection with horizontally disposed pivot pins, such as the pivot pins p shown in FIG. 5. It is to lessen this difficulty that the outer extremities of the arms as shown in FIG. 5 are bent so that they are disposed more or less in parallel. But it will be appreciated that while the difficulty is reduced by bending the outer extremities of the control arms as shown in FIG. 5 it is altogether overcome and avoided by the structure shown in FIG. 14. The control member as shown in FIG. 14 is self-accommodating to the supporting bracket means shown in FIG. 14 through any of a wide range of distances between the supporting brackets.

*The control members 10 and 14 are shown provided with screw holes s for affixing them to the opposed portions of the snow shoe frame. Similar holes $s^1$ are shown at the ends of a modified form of bracket 28 illustrated in FIGURES 7 and 8. The holes h are provided at spaced intervals in members 10a, 10d, 10c and 10e for receiving screw and thumb nut combinations t by which the length of the arms of the control member may be adjusted.*

The combination of the flexible strap members 54 and 64 together with 58, which may be an intermediate portion of 64, and with the keeper 66 common to both of said members 54 and 64, is particularly effective in holding the boot back against the intermediate portion of the control member and in keeping the instep and heel portion of the boot supported by the cross member 58 at all times. Flexible strap parts 64a and 64b, and strap 54 coact in accomplishing this, and they are aided and held in position over the instep of the boot by the keeper 66 which also serves to distribute the pressure of the strap means, 54 and 64a and 64b. This arrangement gives a triangular support which is so effective in use that less dependence than formerly need to be placed on the toe strap 20 which has heretofore been adjusted tightly over the boot for added control of the snow shoe. With the means disclosed above, and particularly in FIGS. 14–16, the snow shoe is controlled primarily from the heel of the boot and while the toe strap still serves to hold the toe portion of the boot down on the surface of the snow shoe, it may be more loosely engaged with the toe portion of the boot than in prior art harnesses thereby improving the circulation in the user's foot and reducing materially the tendency of the user's toes to become cold.

It will be noted that the snow shoe harness disclosed herein in a plurality of modifications may be readily mounted on old as well as on new snow shoes; that a control member may be interchanged between snow shoes of different widths and can be adjusted both in length and in width for use with different sizes of boots as well as on different sizes of snow shoes. It will also be noted that the means for holding the boot back against the intermediate portion of the control member, and the means for providing the control member with a "floor," as well as the means for holding the boot down on the "floor," may be easily and quickly replaced merely by undoing wing nuts, and thus the harness disclosed herein may be repaired in an emergency as by using portions of a leather belt or even pieces of a garment.

There has thus been provided a snow shoe harness in which the above stated objects are accomplished in a thoroughly practical manner.

What I claim is:

1. A snow shoe harness comprising, a rigid heel control member, having an intermediate portion disposed in a vertical plane and adapted to serve as an abutment member for the heel of the boot, and a plurality of rigid arms projecting forwardly and outwardly from the intermediate portion, said control member being twisted at the juncture of the intermediate portion with said arms respectively to dispose said arms in a horizontal plane, substantially at right angles to the plane of the intermediate portion, means for pivotally mounting said control member on a snow shoe for swinging movement in a vertical plane around the forward ends of its arms, including, a pair of vertical pivots on which the forward ends of said arms respectively are mounted, support means for said vertical pivots, a pair of brackets and means for mounting them on a snow shoe, horizontally extending pivots supported by said brackets respectively, the said support means being pivotally mounted on said horizontally extending pivots respectively, means anchored to said control member for keeping the heel of a boot in abutting relation to the intermediate portion of said control member and preventing forward movement of the boot relative to said member, cross means extending across the space defined by the arms of said control member for determining the level of the boot relative to said control member, means for holding the heel portion of the boot down on the cross means, and means for holding down the toe of the boot without interfering with the raising and lowering of the heel of the boot and the said control member.

2. The snow shoe harness claimed in claim 1 in which the cross means extending across the space between the arms of said control member is adapted to be engaged with at least one of said arms at either of a plurality of points spaced longitudinally of it to compensate for differences in the distance between said arms and means are provided for detachably securing said cross means to said arms at either of said points.

3. The snow shoe harness claimed in claim 1 in which the cross member is a portion of the means for holding the heel portion of the boot down on the cross member.

4. A snow shoe harness comprising in combination, a pair of brackets mounted on a snow shoe in laterally spaced relation, and a control member the ends of which are pivotally connected to said brackets respectively, said control member being shaped so that it has a curved intermediate portion, disposed rearwardly of the snow shoe from its pivoted ends, and two low rigid arms extending from said intermediate portion forwardly and outwardly to said brackets respectively at a level which is approximately the level of the bottom edge of said intermediate portion, said brackets comprising means for engagement with the snow shoe, first pivot means extending inwardly parallel with, and close to, the surface of the snow shoe, a pair of short, rigid straps rotatably mounted on said pivot means respectively, and a second pair of pivots normal to, and extending upwardly from said short straps respectively, the forward ends of the arms of the control member being pivoted on said second pair of pivots respectively.

5. The snow shoe harness claimed in claim 4 in which the arms of said rigid control member each comprise a plurality of parts and means are provided for selectively interconnecting the parts of each arm in a plurality of overlapped positions to control the length of said arms respectively.

6. The snow shoe harness claimed in claim 4, in which the said control member is sufficiently resilient to permit its arms to be moved somewhat toward and away from one another thereby changing the relative angle between said arms and the distance between opposed points on the arms, and including a cross member extending across the space between the arms of said rigid control member to provide a floor for the instep and heel portion of a boot and means for detachably securing the cross member to said arms at points selected in accordance with the distance between the said arms.

7. The snow shoe harness claimed in claim 4 including a cross member extending across the space between the arms of said rigid control member to provide a floor for the instep and heel portion of a boot, means adjustable in length and secured to the curved intermediate portion of the control member and adapted to be passed around the boot and fastened, to hold the heel of the boot in abutting relation to the midpart of the intermediate portion, means adjustable in length and secured to the control member on either side adjacent the points of juncture between the arms and the intermediate portion to hold the heel and instep portions of the boot down on said cross member, and keeper means common to and engageable with both said last mentioned means disposed over the instep of the boot.

References Cited in the file of this patent or the original patent

UNITED STATES PATENTS

| | | |
|---|---|---|
| 2,420,261 | Nadeau | May 6, 1947 |
| 2,738,596 | Walsh | Mar. 20, 1956 |
| 2,769,250 | Rinkinen | Nov. 6, 1956 |
| 2,821,031 | Howe | Jan. 28, 1958 |
| 2,987,884 | Howe | June 13, 1961 |